(12) United States Patent
Burke et al.

(10) Patent No.: US 6,572,043 B1
(45) Date of Patent: Jun. 3, 2003

(54) VERTICAL DRAG WHEEL FOR A SPINCAST REEL

(75) Inventors: Marde Burke, Owasso, OK (US); Henry L. Neufeld, Tulsa, OK (US)

(73) Assignee: W. C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 09/901,477

(22) Filed: Jul. 7, 2001

(51) Int. Cl.[7] .............................................. A01K 89/033
(52) U.S. Cl. ...................................... 242/244; 242/310
(58) Field of Search ................................ 242/244, 245, 242/246, 310; D22/140, 141

(56) References Cited

U.S. PATENT DOCUMENTS

| 2,719,680 | A | * | 10/1955 | Denison ................. 188/250 R |
| 2,903,202 | A | * | 9/1959 | Sarah ......................... 242/236 |
| 2,929,579 | A | * | 3/1960 | Hull .......................... 242/238 |
| 2,988,298 | A | * | 6/1961 | Purnell ...................... 242/244 |
| 2,989,266 | A | * | 6/1961 | Yeada ........................ 242/238 |
| 3,026,058 | A | * | 3/1962 | Denison ..................... 188/82.9 |
| 3,088,691 | A | * | 5/1963 | Hull .......................... 242/244 |
| 3,175,781 | A | * | 3/1965 | Maury ........................ 242/240 |
| 3,198,456 | A | * | 8/1965 | Wood ......................... 242/239 |
| 3,255,981 | A | * | 6/1966 | Wood ......................... 188/292 |
| 3,778,001 | A | * | 12/1973 | Hull .......................... 242/244 |
| 3,836,092 | A | * | 9/1974 | Hull .......................... 242/238 |
| 3,900,167 | A | * | 8/1975 | Hull .......................... 242/244 |
| 4,101,087 | A | * | 7/1978 | Harre et al. ................ 242/236 |
| 4,527,437 | A | * | 7/1985 | Wells ........................ 73/864.11 |
| 4,664,330 | A | * | 5/1987 | Darden .................... 188/251 A |
| 4,722,491 | A | * | 2/1988 | Myojo ........................ 242/141 |
| 4,725,012 | A |   | 2/1988 | Councilman ........... 242/84.5 A |
| 5,118,048 | A | * | 6/1992 | Childre et al. ............. 242/245 |
| 5,231,892 | A | * | 8/1993 | Haight ........................ 74/523 |
| 5,244,165 | A |   | 9/1993 | Valentine et al. ........... 242/244 |
| 5,393,004 | A | * | 2/1995 | Weaver et al. .............. 242/244 |
| 5,427,325 | A |   | 6/1995 | Weaver ...................... 242/244 |
| 5,603,465 | A | * | 2/1997 | Henriksson ................ 242/246 |
| 5,740,975 | A | * | 4/1998 | Cho ........................... 242/244 |

* cited by examiner

Primary Examiner—Kathy Matecki
Assistant Examiner—Minh-Chau Pham
(74) Attorney, Agent, or Firm—Fellers, Snider, Blankenship, Bailey & Tippens, P.C.

(57) ABSTRACT

A drag adjustment mechanism for a spincast reel which includes a drag adjustment wheel, accessible from the exterior of the reel, which is configured to rotate in a plane parallel to the front-to-back axis of the reel. In a preferred embodiment, the drag adjustment wheel includes: a first axle projecting from a first face; a drive gear extending from a second face; a second axle extending from the drive gear; and a gripping surface formed circumferentially about the perimeter of the wheel. In a preferred embodiment, the wheel is of a two-part construction wherein all of the components of the wheel, except the gripping surface, are die cast from metal and the gripping surface is molded over the die cast wheel.

7 Claims, 5 Drawing Sheets

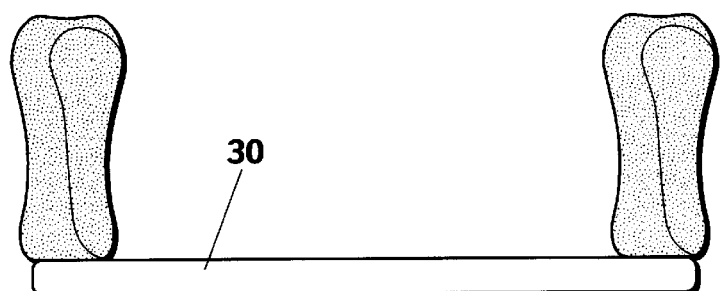
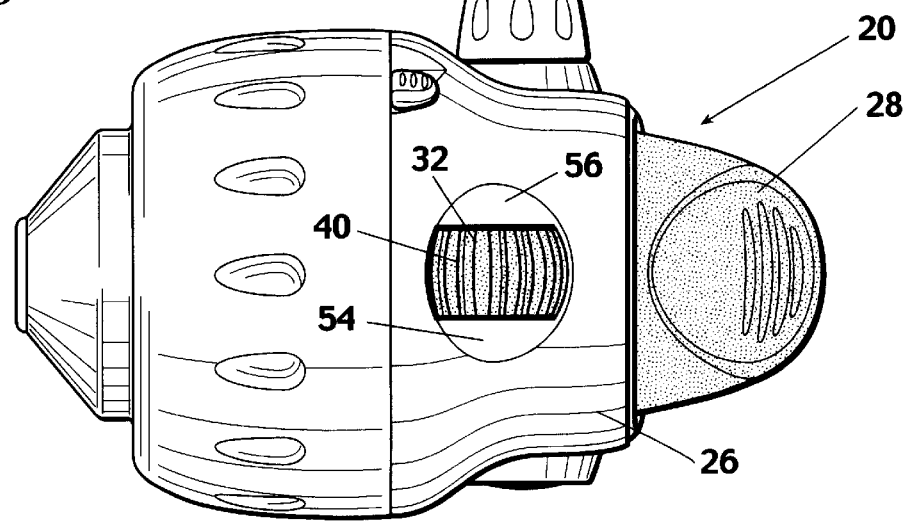
Fig. 7
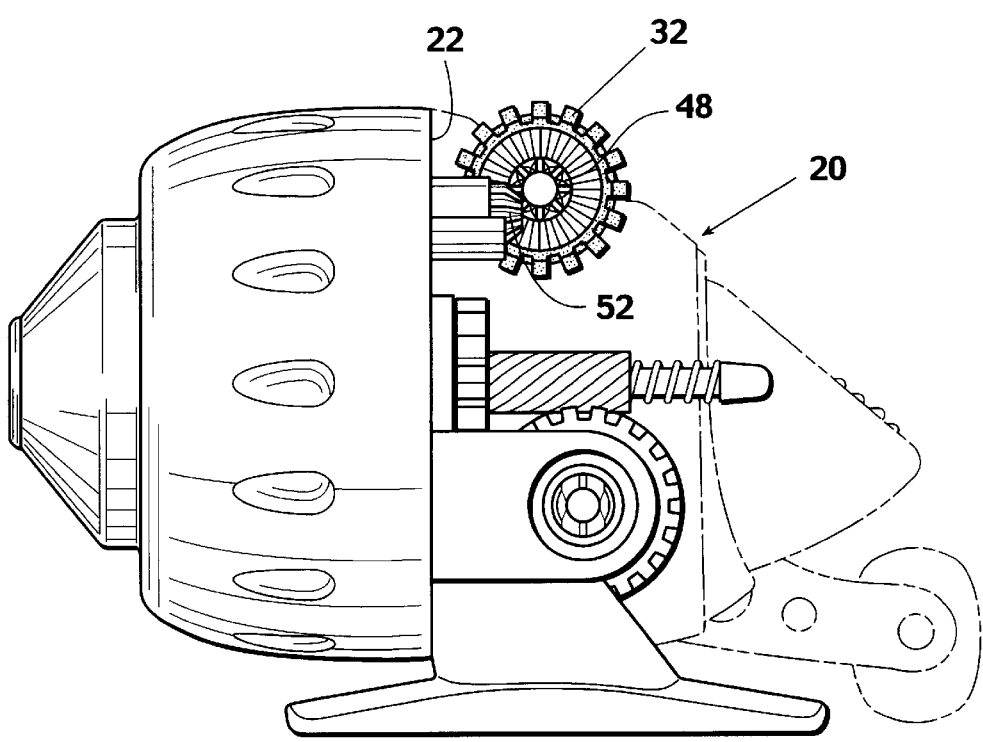
Fig. 6

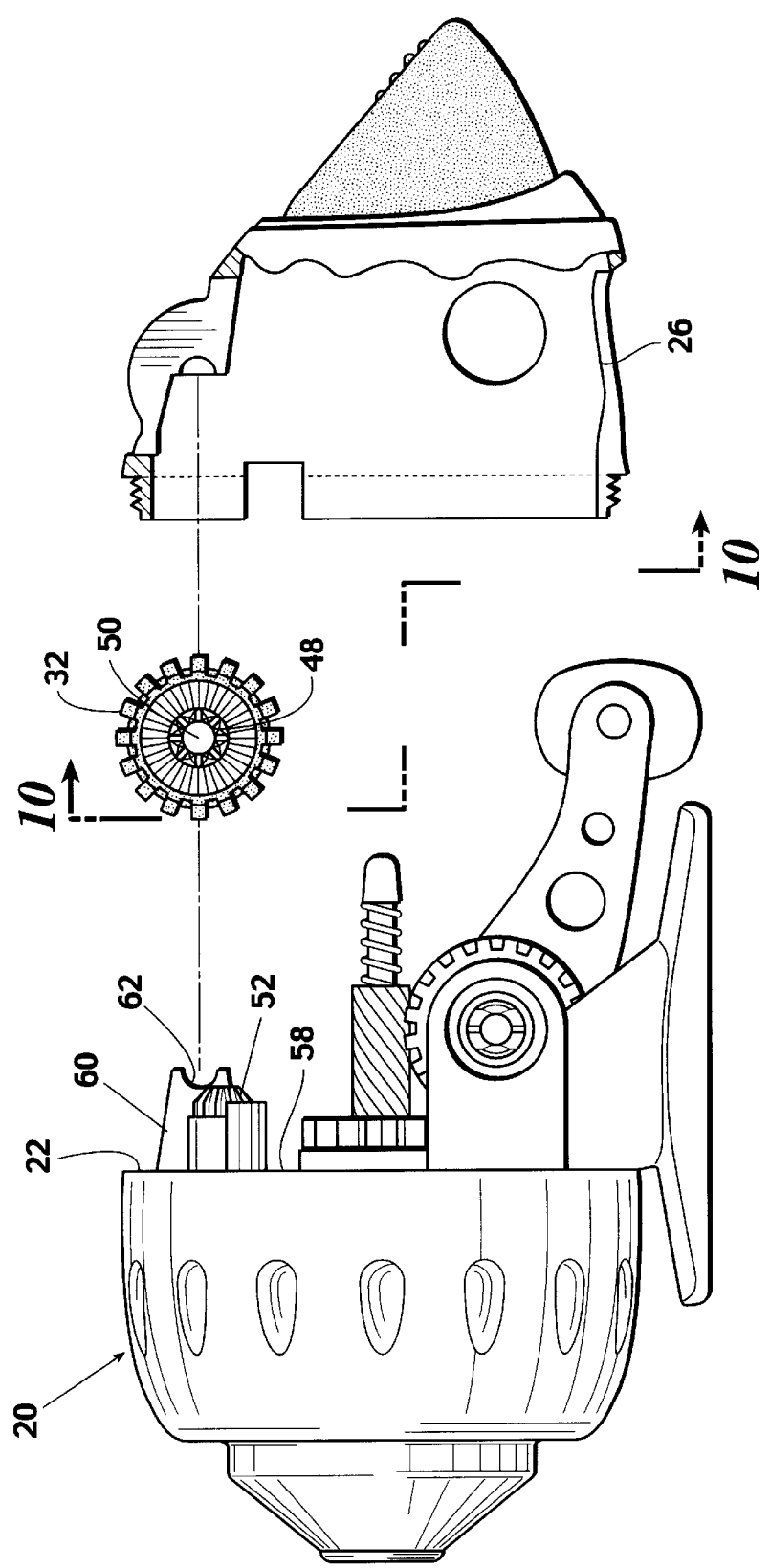

VERTICAL DRAG WHEEL FOR A SPINCAST REEL

BACKGROUND OF THE INVENTION

1. Field of the Invention

The present invention relates to a drag adjustment mechanism for spincast fishing reels. More particularly, but not by way of limitation, the present invention relates to a drag adjustment wheel for a spincast fishing reel which rotates in a plane parallel to the fishing rod.

2. Background of the Invention

Spincast reels are well know in the art. A spincast reel will typically include: a central body or frame; a front cover positionable over at least the front face of the frame and having a tapered forward wall; a back cover positionable over at least the back face of the frame; a casting button operably projecting from the back cover; and a crank handle extending from the side of the fishing reel. Most of the reel's operating structures and operating mechanisms are either mounted on, formed on, or mounted through the frame. As discussed hereinbelow, the crank handle is operable for winding a fishing line around a line spool contained within the spincast reel. The line spool is typically mounted on a spool hub projecting forwardly from the front of the frame.

A spincast reel will also include a foot structure for securing the reel on a fishing rod. The foot structure typically extends from either the bottom of the frame or the bottom of the back cover. Spincast reels having the foot extending from the bottom of the back cover are typically constructed such that, when the reel is assembled, the frame is almost completely housed within the front and back covers.

The operating structures and mechanisms contained in a spincast reel typically include: an elongate, main shaft slidably and rotatably extending through the frame and through the spool hub; a spinnerhead secured to the forward end of the main shaft; a pinion gear positioned around the main shaft; a crankshaft extending from the crank handle into the side of the reel and through a crankshaft boss provided on the rearward face of the frame; a drive gear (e.g., a face gear) secured on the interior end of the crankshaft; an anti-reverse mechanism (e.g., a ratchet/pawl-type mechanism) associated with the crankshaft for preventing reverse rotation of the crank handle and crankshaft; and an adjustable drag system.

When an excessive pulling force is applied to the fishing line, the drag system counteracts the reels's anti-reverse mechanism to payout a sufficient amount of additional fishing line to prevent the line from breaking. Most drag systems function to allow either (a) an adjustable degree of rotational slippage of the line spool about the spool hub or (b) an adjustable degree of rotational slippage of the drive gear about the crankshaft. A typical drag system will also include an external adjustment means comprising either a finger-operated drag wheel projecting from the reel housing or a star-shaped dial operably secured adjacent the crank handle on the exterior end of the crankshaft.

Providing an externally accessible adjustment for the drag system is important for a number of reasons. For example, different drag settings are appropriate for different types of fishing. It may also be desirable to adjust the drag setting on a reel once a fish has been hooked. Ideally, therefore, the drag adjustment will be positioned such that it is readily accessible by the fisherman while a fish is being reeled in.

Traditionally, prior art drag wheels provided on spincast fishing reels have rotated in a plane perpendicular to the fishing rod. While such drag adjustments perform well, their use is somewhat inconvenient and is counter-intuitive to many fishermen, particularly when adjustment is necessary while a fish is being reeled in, and especially if the fisherman is "palming" the reel. For example, U.S. Pat. No. 5,427,325 issued to Weaver, which is incorporated herein by reference, describes a drag system having a conventional adjustment dial.

U.S. Pat. No. 4,725,012 issued to Councilman describes the problem with prior art drag systems in that the user must hold the pole in one hand and manually rotate the drag knob until a desired setting is achieved. Ideally, a drag adjustment knob could instead be operated while holding the rod and operating the crank handle.

Thus, it can be seen that a need exists for a drag adjustment mechanism which is readily accessible by the fisherman and the use of which is intuitive in nature.

SUMMARY OF THE INVENTION

The present invention provides an adjustment mechanism for a drag system on a spincast fishing reel which satisfies the needs and alleviates the problems mentioned above. The drag adjustment wheel rotates in a plane parallel to the fishing rod such that it is easily moved by the thumb of the hand grasping the rod in a convenient and intuitive manner.

Since rotation of the drag wheel is performed in line with the fishing rod, its orientation may be thought of as "vertical", as opposed to traditional drag wheels which rotate parallel to the fishing rod and thus, may be thought of as "horizontal".

In one aspect, the inventive vertical drag adjustment wheel is incorporated into a spincast fishing reel comprising: a body structure; a rear cover assembly; a front cover assembly; a casting actuator included in rear cover assembly; a crank handle rotatably mounted on the side of the body; and a vertical drag wheel, operably projecting through the top of the body structure, for adjusting the reel's internal drag system.

In another aspect, the inventive vertical drag wheel is incorporated into a drag system for a spincast fishing reel comprising: a line spool for storing the fishing line; an adjustable drag system which will automatically pay out fishing line from the spool if the tension on the line exceeds a selected level; and a vertical drag knob which is easily accessible to the fisherman while the reel is in use.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 6 provides a left side view of the spincast reel with the back cover removed.

FIG. 7 provides a top plan view of the spincast reel having a vertical drag adjustment wheel.

FIG. 9 provides an exploded side view of the spincast reel.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
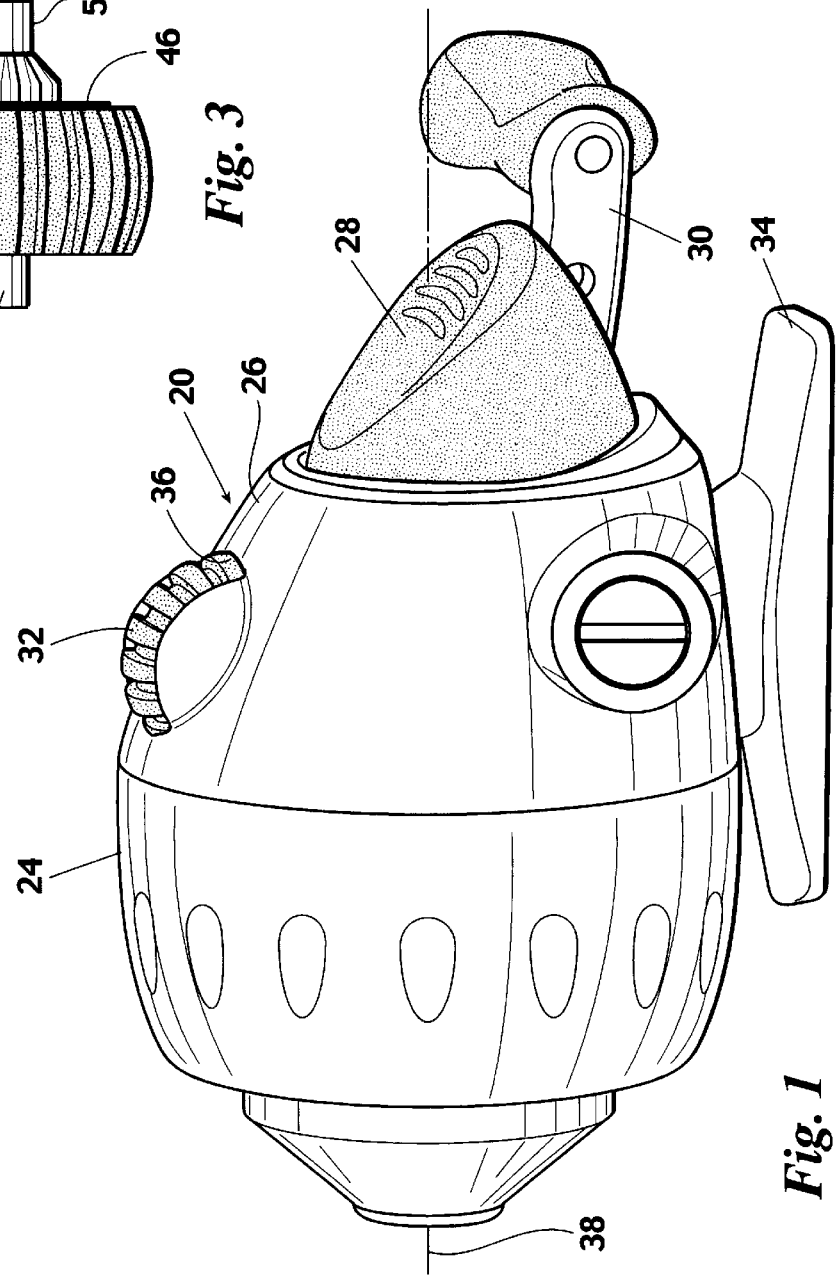
FIG. 1 provides a perspective view of the inventive spincast fishing reel having a vertical drag adjustment wheel.

Referring now to the drawings, wherein like reference numerals indicate the same parts throughout the several views, a preferred embodiment of a spincast reel 20 having the inventive vertical drag adjustment wheel is shown in FIG. 1. Preferably, spincast reel 20 comprises: body structure 22 (FIG. 6); front cover 24 removably attached to the front of body structure 22; back cover 26 removably attached to the back of body structure 22; actuator button 28 accessible from behind back cover 26; reversible crank handle 30 extending from the side of back cover 26; a reel foot 34 extending downward from body structure 22 for mounting reel 20 on a fishing rod; and vertical drag adjustment wheel 32 protruding through aperture 36 provided in the top of back cover 26.

As will be apparent to those skilled in the art, the inventive vertical drag adjustment wheel 32 is shown as incorporated in a spincast reel 20 having a reversible crank handle 30. It should be noted that the invention is not so limited and is equally suitable for use in reels in a fixed configuration as either right-handed or left-handed.

It should also be noted that drag adjustment wheel 32 is mounted in reel 20 such that wheel 32 may be rotated by fore and aft movement against the top of wheel 32. This rotation lies in a plane parallel to the front-to-rear axis 38 of reel 20, which is also parallel to the fishing rod when reel 20 is mounted on a rod. Thus, this movement may be thought of as "vertical". In contrast, conventional adjustment wheels rotate in an axis perpendicular to the rod and thus can be thought of as "horizontal".

Figure 2:
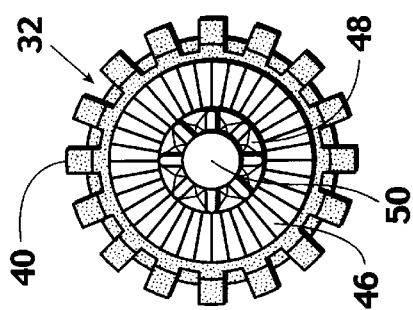
FIG. 2 provides a side plan view of the inventive vertical drag adjustment wheel.
Figure 3:
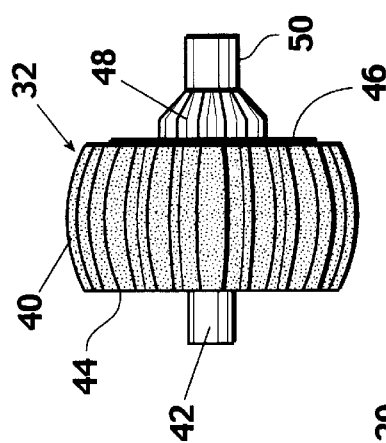
FIG. 3 provides a front plan view of the vertical drag adjustment wheel.

Referring next to FIGS. 2 and 3, the inventive vertical drag wheel 32 includes: a right face 44; a left face 46 having a serrated surface for interaction with an optional clicker spring; a gripping surface 40 circumferentially located about the perimeter of wheel 32; an axle 42 extending from the right face 44 of wheel 32; a drive gear 48 extending from left face 46; and an axle 50 extending from drive gear 48.

Gripping surface 40 is typically formed of a plastic material, preferably a somewhat deformable, elastomeric, material such as rubber, vinyl, urethane, or the like. The other components of wheel 32 are preferably formed of a rigid material such as metal, an injection molded plastic (i.e., ABS, polyethylene, etc.), or the like. In a preferred embodiment, the wheel 32 is a two-part rubber/die cast structure wherein all of the wheel except the gripping surface 40 is die cast in metal as a unitary structure and the gripping surface 40 is molded from rubber directly over the die cast portion.

Referring next to FIG. 6, vertical drag wheel 32 is rotatably mounted in reel 20 such that gear 48 meshes with drag gear 52. As can be seen, forward rotation of wheel 32 results in clockwise rotation of drag gear 52 and rearward rotation of wheel 32 results in counterclockwise rotation of gear 52. As will be apparent to those skilled in the art, gears 48 and 52 interact to rotate the torque produced by wheel 32 by ninety degrees. Thus, rotation of gear 52 is in the same directions as is the rotation produced by conventional, prior art drag knobs. Accordingly, the torque produced at gear 52 may be used to vary the settings of virtually any conventional drag system presently employed in a spincast reel.

Drag systems for spincast reels are well known in the art. While the inventive adjustment mechanism is suitable for use with a wide variety of drag systems, one such system, by way of example and not limitation, is described in U.S. Pat. No. 5,244,165 issued to Valentine, et al. which is incorporated herein by reference. In such a drag system, rotation of a threaded member results in an increased or decreased pressure between a clutch plate and the line spool. As the pressure on the clutch plate increases, greater tension on the fishing line is required before the drag system allows the line to pay out. Similarly, when there is less pressure on the clutch plate, fishing line will pay out with less tension applied to the fishing line.

Figure 4:
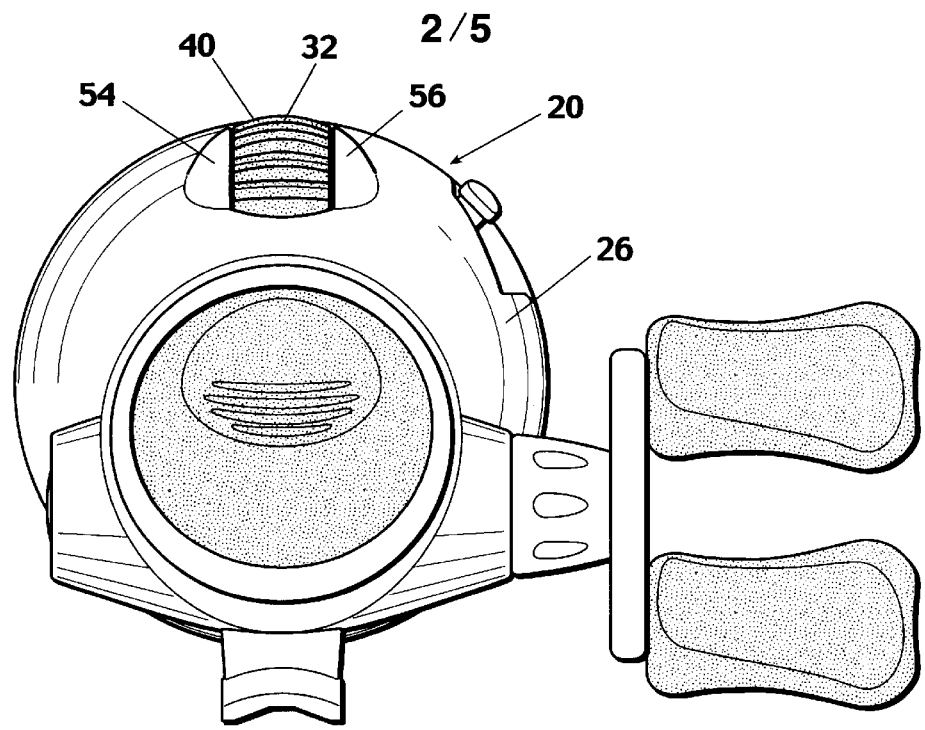
FIG. 4 provides a back view of the spincast reel having a vertical drag adjustment wheel.
Figure 5:
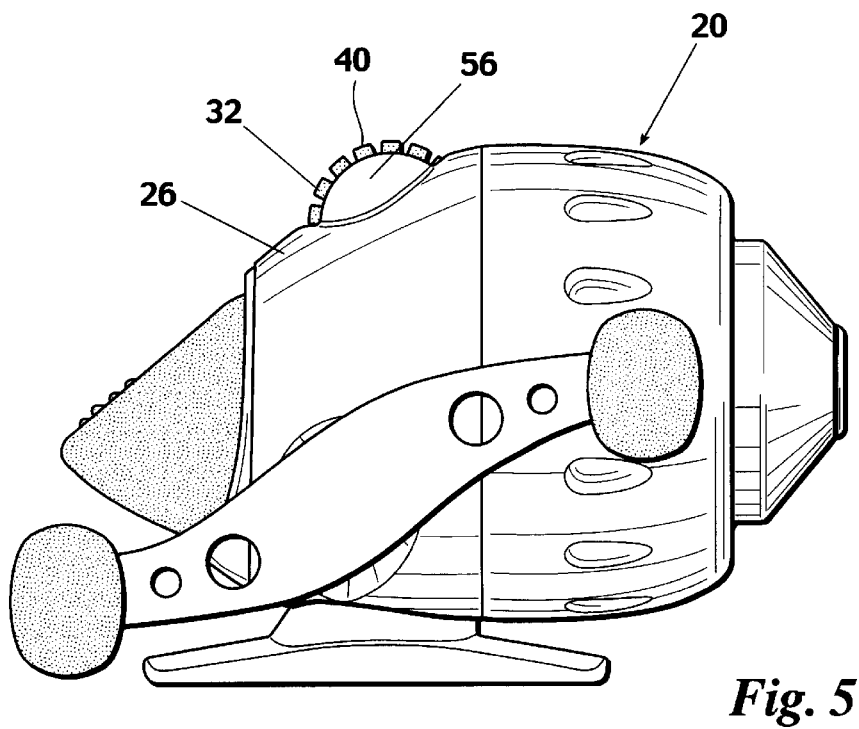
FIG. 5 provides a right side view of the spincast reel having a vertical drag adjustment wheel.

Referring to FIG. 4, to reduce the risk of damage to the drag adjustment mechanism and to reduce the opportunity for introducing contaminants into the reel, when the reel 20 is assembled, aperture 36 is formed in back cover 26 such that access to adjustment wheel 32 is limited to the gripping surface 40. Aperture 36 is flanked by wheel covers 54 on the left and 56 on the right to cover, and protect, the sides of adjustment wheel 32. As can best be seen in FIG. 5, the user is provided access to substantially the entire thickness of the gripping surface 40, to provide a comfortable, but solid grip when rotating wheel 32. Referring next to FIG. 7, it can be seen that the placement of wheel 32 relative to thumb casting actuator 28 allows the fisherman to easily access wheel 32 with the same thumb as used to operate actuator 28 during the casting operation. Those familiar with fishing with a spincast reel will readily appreciate the fact that fore and aft movements of the thumb, as used to rotate the inventive wheel 32, are far more natural than left-to-right movements required to move conventional drag adjustment wheels. Furthermore, one can appreciate that, for example, the wheel 32 may be easily moved with the left thumb while the rod is gripped with the left hand and the crank handle 30 is operated with the right hand.

Figure 8:
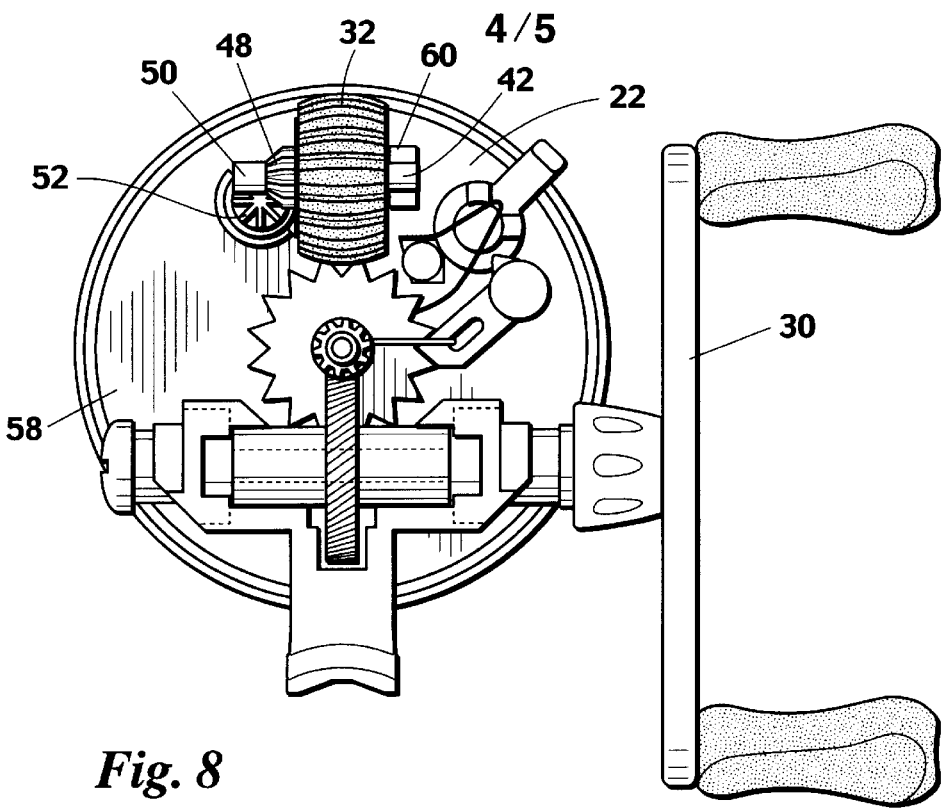
FIG. 8 provides a back view of the spincast reel with the back cover removed.
Figure 10:
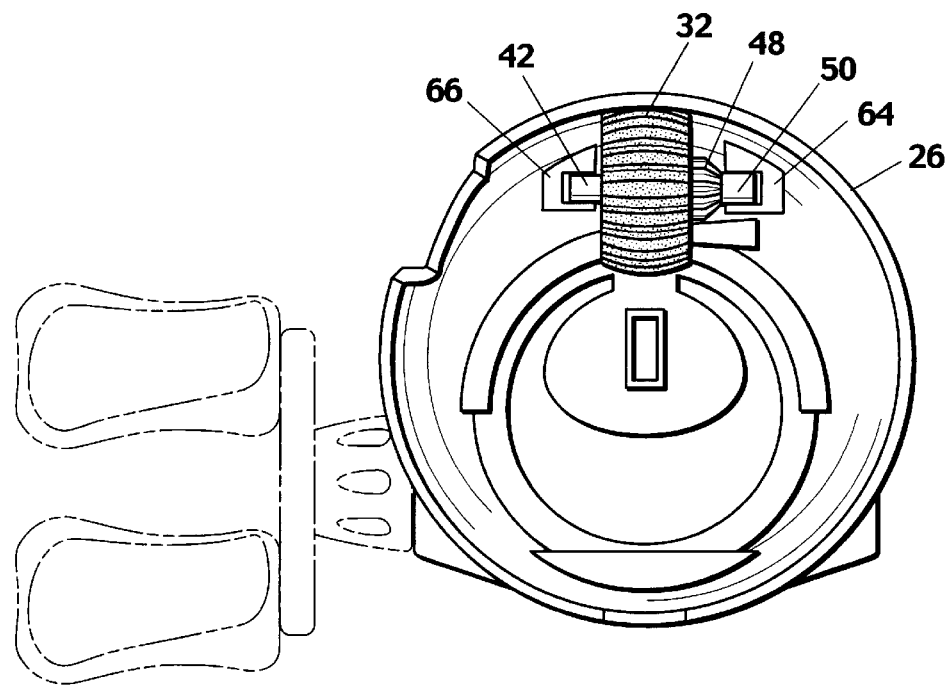
FIG. 10 provides a front view of the back cover from perspective 10—10 of FIG. 9.

Referring next to FIGS. 8 and 9, body structure 22 includes a rearward face 58. A bracket 60 having notch 62 extends rearward from face 58 to capture axle 42 of wheel 32 when reel 20 is assembled. Typically, as shown in FIG. 10, to install the back cover 26 over body structure 22, wheel 32 is first installed in rear cover 26 with axle 42 resting in right support 66 and axle 50 resting in left support 64. Continuing with FIGS. 8, 9, and 10, as cover 26 is installed, axle 42 is captured by notch 62 while axle 50 is held in support 64 by the meshing of drive gear 48 with drag gear 52 to rotatably secure wheel 32 in reel 20.

As will be apparent to those skilled in the art, while a number of the features described with reference to the preferred embodiment are not necessary to practice the present invention. By way of example, and not limitation, the degree to which the sides of the wheel are accessible, the precise placement of the wheel, the method of rotatably mounting the wheel in the reel, and the like, are simply design choices which are immaterial to the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In a spincast fishing reel having a front cover, a line spool for storage of the fishing line, a spinner head for rewinding the fishing line onto the spool, a crank handle for rotating the spinner head, and an adjustable drag system for allowing rotation of the spool, or rotation of the spinner head relative to the crank handle, when the tension on the fishing line exceeds a selectable level, and an adjustment mechanism for selecting the drag level, the adjustment mechanism comprising:

a drag adjustment wheel rotatably secured inside a reel cover such that rotation of said drag adjustment wheel is in a plane parallel with the front-to-rear axis of the fishing reel, said drag adjustment wheel accessible from the exterior of the reel; and a back cover, said back cover including an aperture for access to said drag adjustment wheel and including a first wheel cover for covering a first side of said drag adjustment wheel and a second wheel cover for covering a second side of said drag adjustment wheel wherein only a portion of a gripping surface of said drag adjustment wheel protrudes through said aperture.

2. The spincast fishing reel of claim 1 wherein said drag adjustment wheel comprises:

a wheel, said wheel formed of a rigid material; and a gripping surface applied circumferentially about the periphery of said wheel, said gripping surface formed of rubber wherein only a portion of a gripping surface of said drag adjustment wheel protrudes through an aperture.

3. In a spincast fishing reel having a front cover, a line spool for storage of the fishing line, a spinner head for rewinding the fishing line onto the spool, a crank handle for rotating the spinner head, and an adjustable drag system for allowing rotation of the spool, or rotation of the spinner head relative to the crank handle, when the tension on the fishing line exceeds a selectable level, and an adjustment mechanism for selecting the drag level, the adjustment mechanism comprising:

a drag adjustment wheel rotatably secured inside a reel such that rotation of said drag adjustment wheel is in a plane parallel with the front-to-rear axis of the fishing reel, said drag adjustment wheel accessible from the exterior of the reel; and wherein said drag adjustment wheel further comprises a drive gear and the adjustment mechanism further comprises a drag gear, wherein said drive gear meshes said drag gear at a right angle such that rotation of said drag adjustment wheel results in rotation of the drag gear in a plane perpendicular to the front-to-rear axis of the spincast fishing reel.

4. A vertical drag adjustment wheel for a spincast fishing reel comprising:

a circular wheel having a first face and a second face, said circular wheel projecting through an aperture in a back cover of the spincast fishing reel;

a first axle projecting from, and perpendicular to, said first face;

a drive gear extending from, and coaxial with, said second face, said drive gear positively rotationally engaged with said circular wheel;

a second axle projecting from said drive gear; and a gripping surface formed circumferentially about the outer edge of said wheel.

5. The vertical drag adjustment wheel of claim 4 wherein said gripping surface is formed of an elastomeric material wherein only a portion of said gripping surface of said drag adjustment wheel protrudes through an aperture.

6. A vertical drag adjustment wheel for a spincast fishing reel comprising:

a circular wheel having a first face and a second face;

a first axle projecting from, and perpendicular to, said first face;

a drive gear extending from, and coaxial with, said second face;

a second axle projecting from said drive gear;

a gripping surface formed circumferentially about the outer edge of said wheel;

wherein a portion of said gripping surface projects through an aperture in a back of the spincast fishing reel;

wherein said gripping surface is formed of an elastomeric material; and wherein said circular wheel, said first and second axles, and said drive gear are die cast as a unitary structure.

7. In a spincast fishing reel having a front cover, a line spool for storage of the fishing line, a spinner head for rewinding the fishing line onto the spool, a crank handle for rotating the spinner head, and an adjustable drag system for allowing rotation of the spool, or rotation of the spinner head relative to the crank handle, when the tension on the fishing line exceeds a selectable level, and an adjustment mechanism for selecting the drag level, the adjustment mechanism comprising:

a drag adjustment wheel rotatably secured inside a reel cover such that rotation of said drag adjustment wheel is in a plane parallel with the front-to-rear axis of the fishing reel, said drag adjustment wheel accessible from the exterior of the reel; and wherein a user accessible portion of said drag adjustment wheel defines a vertical plane parallel with said front-to-rear axis of the fishing reel, wherein said plane intersects an actuator button.

* * * * *